March 2, 1943.   J. H. NORRID   2,312,971
INSULATED SIDING CUTTER
Filed Jan. 26, 1942   2 Sheets-Sheet 1
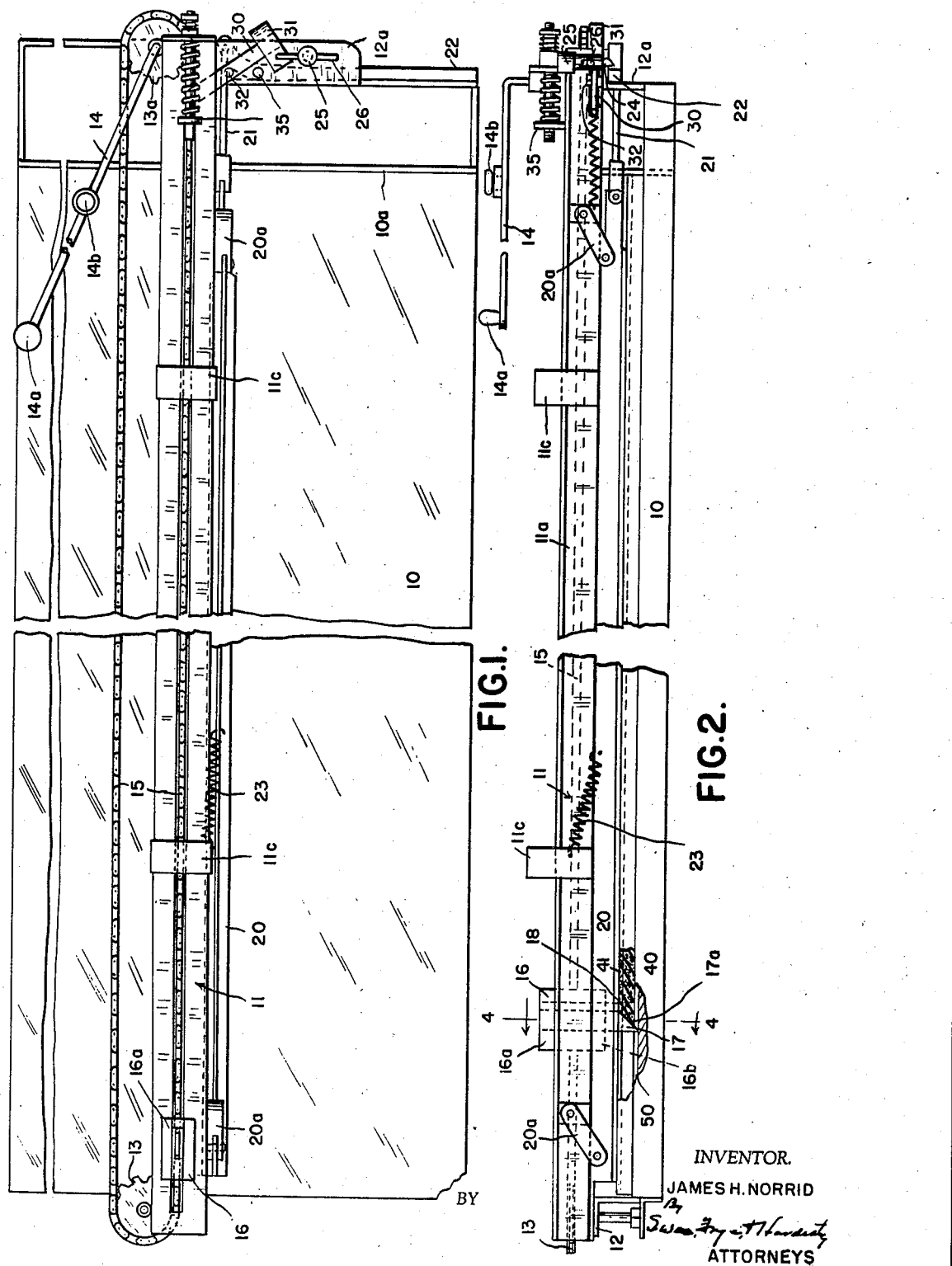
INVENTOR.
JAMES H. NORRID
ATTORNEYS March 2, 1943.  J. H. NORRID  2,312,971
INSULATED SIDING CUTTER
Filed Jan. 26, 1942  2 Sheets-Sheet 2

INVENTOR.
JAMES H. NORRID
BY
ATTORNEYS

Patented Mar. 2, 1943

2,312,971

UNITED STATES PATENT OFFICE 2,312,971

INSULATED SIDING CUTTER

James H. Norrid, Detroit, Mich.

Application January 26, 1942, Serial No. 428,162

4 Claims. (Cl. 164—73)

The present invention relates to devices for cutting sheet material and specifically to portable cutting machines for materials such as sheet building materials.

In recent years it has become a common practice, in the rebuilding or remodeling of houses and even in the building of new structures to cover a frame or an outside wall with sheet material consisting of sheet material having on one side a coating of adhesive waterproof material, such as asphaltic material, in which is partially embedded sufficient fine gravel to substantially cover the adhesive material.

In some cases, the thus coated sheet material is colored and pressed to imitate brickwork.

In the operation of applying this building material, the standard size sheets must frequently be cut, and heretofore all such cutting at the scene of operations has had to be cut by hand, and due to the graveled surface, this operation, beside being very laborious, is rendered more difficult by the knife or saw dulling effect of the gravel.

Among the objects of the present invention, therefore, is cutting means for such materials that will overcome the objections above indicated.

Another object is cutting means for such materials that is easily portable and may be used at the scene of operations.

Another object is cutting means that, in spite of the gravelled coating, will not easily become dull.

Another object is a cutting device which provides a smooth accurate cut at any desired angle to the longitudinal line of the sheet.

Still other objects will readily occur to those skilled in the art upon reference to the following description and the accompanying drawings in which Figure 1 is a plan view of a machine embodying the present invention.

Figure 2 is a side elevation of the same.

Figure 3:
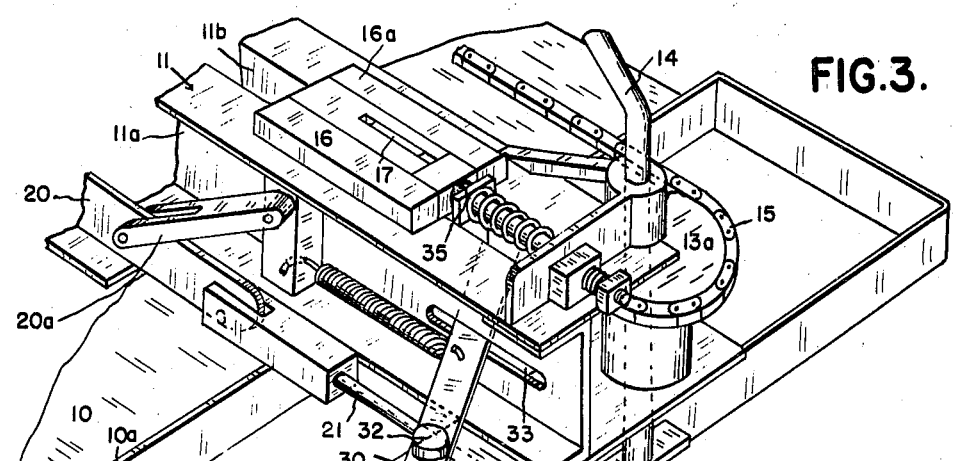
Figure 3 is a perspective view on a larger scale of one end of the same.

As indicated, a machine embodying the present invention comprises an elongated base or platform 10 bridging which and suitably spaced therefrom is a track 11 conveniently and preferably made of two channel members 11a and 11b arranged parallel and in spaced relation. These track members 11a and 11b are fixed together by welding or otherwise fixing thereto the inverted U-shaped bars 11c, of which there may be several, and the track 11, as thus made, is mounted above the base 10 upon suitable angle irons or brackets 12 and 12a, the latter, as shown in Figure 3, being spaced from its end of the base.

Also carried by the brackets 12 and 12a are two sprocket wheels 13 and 13a, the latter being provided with a crank 14 by means of which it may be rotated, and over these wheels extends a sprocket chain 15, the ends of which are attached to a block 16 arranged to be moved in either direction upon track 11.

Figure 4:
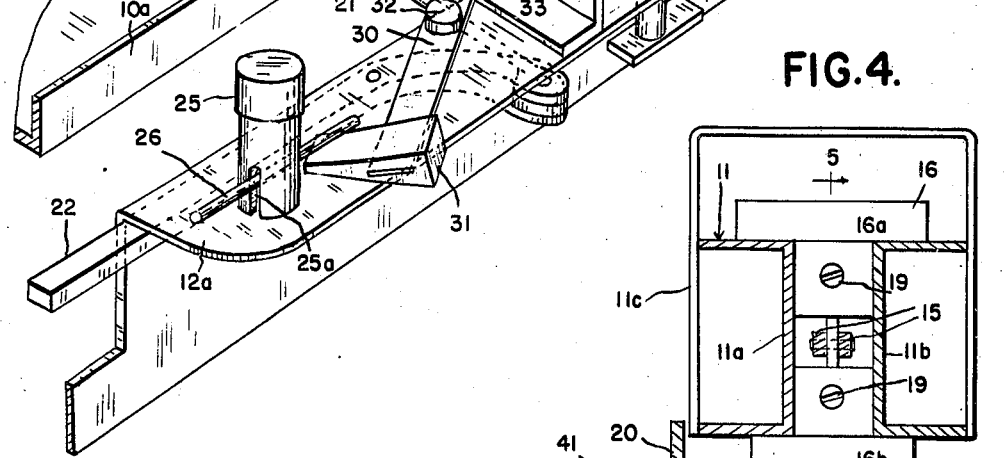
Figure 4 is a section on line 4—4 of Figure 2, but somewhat enlarged.
Figure 5:
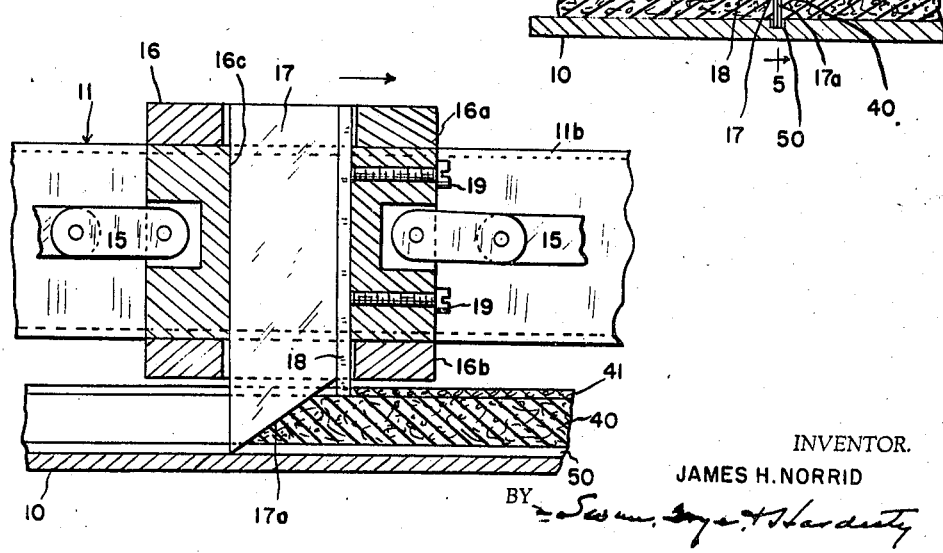
Figure 5 is a section on line 5—5 of Figure 4.

The block 16, as shown best in Figures 4 and 5, consists of a built up member, having upper and lower flanges 16a and 16b preventing vertical movement, and having a central vertical slot 16c for the knife 17, which is preferably of rather thin metal and, while arranged vertically, is provided with an angular cutting edge 17a.

Also mounted in slot 16c and arranged to project downwardly a short distance below the upper end of cutting edge 17a, is a plow element 18 consisting of a small bar of metal which together with the knife 17 may be conveniently fixed in place by the screws 19.

As shown best in Figure 3, the base 10, at one end is provided with an upstanding flange 10a serving as an abutment against which rests the material to be cut, and at this same end, the bracket 12a is spaced somewhat from the end of the base. This bracket 12a, beside carrying the end of track 11 and sprocket 13, also carries means for operating the material clamping mechanism.

The clamp means itself is shown best in Figures 1, 2 and 4. It consists of a T-section member 20 carried on links 20a, pivoted upon track 11, and movable endwise by means of a link 21 pivoted to the end of member 20 and to a lever 22 horizontally mounted under bracket 12a, a suitable spring 23 being provided to maintain member 20 in a retracted or release position. In all of the figures, the clamp with its associated mechanism is shown in clamping position.

When the lever 22 is moved to the position shown clearly in Figure 1, i. e. to clamping position, it is held against the tension of spring 23, by means of a spring operated latch 24 carried in the housing 25 mounted on bracket 12a with the latch 24 extending down through the latter into the path of lever 22.

As shown in Figures 2 and 3, the latch housing 25 is slotted as at 25a to permit vertical movement of a pin 26 which is fixed to latch 24 and moves up and down therewith and serves as a means to release the lever 22 either by hand or automatically as will be described.

Also mounted upon bracket 12a is a second lever 30 provided at one end with a wedge element 31 adapted to be moved under the pin 26 and to thereby lift the latch 24 from engagement with lever 22.

Lever 30 is pivoted at 32 and has that end opposite wedge 31, extending through a suitable slot 33 in track 11 into the path of block 16 and in position to be moved thereby when the block approaches the end of its cutting movement.

Also positioned in the path of the block 16 and suitably mounted on track 11 is a spring bumper 35 so placed that the block comes into contact therewith immediately after the knife 17 has passed through a suitable notch (not shown) in flange 10a. The bumper 35 will of course prevent the sudden further movement of the block 16 after the cessation of the resistance offered in cutting the material and will also permit a small further movement whereby to actuate lever 30 to release the clamp.

In the operation of the device, after the block 16 has been moved back (i. e. to the left hand end of Figs. 1 and 2), the material to be cut is placed under the track 11 and against flange 10a and clamped by moving lever 22 to the position shown where it is held by latch 24.

The operation of crank 14 then causes the knife 17 to be drawn through the material preceded by the plow 18 which removes the abrasive gravel, sand or the like from the path of the knife. As the knife leaves the material and the block 16 strikes the bumper 35 and is then moved a further short distance, the lever 30 is swung to force the wedge 31 under the pin 26 to lift the latch 24 and release lever 22 and allow spring 23 to draw back the clamping bar 20 and thereby release the material.

In Figs. 2, 4 and 5 the material being cut is indicated at 40 with the layer of waterproofing and abrasive material shown at 41. Where no such layer of waterproofing and abrasive is present, the plow 18 need not be used, but if such a layer is present, the plow should be so adjusted as to extend down to a sufficient depth to pass through the abrasive layer.

For convenience in actuating the cutting block, the crank 14 may be provided with a plurality of handles 14a and 14b, the latter being conveniently used in moving the block in its backward movement at a somewhat greater speed. Further, in order to provide for a complete severance of the material, it is preferred to provide the base 10 with a longitudinal groove 50 to allow the point of knife 17 to extend below the under surface of the material being cut.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

What I claim is:

1. In a cutting device for sheet material having a coating of abrasive material, a knife, means for producing relative movement between said knife and sheet material and means movable in advance of said knife for removing said abrasive material from the path of said knife.

2. In a cutting device for sheet material having a coating of abrasive material, a block having a knife fixed therein and adapted to be moved transversely of said sheet to cut the same, and means carried by said block to prevent contact of said knife with said abrasive material.

3. In a cutting device for sheet material having a coating of abrasive material, a block having a knife fixed therein and adapted to be moved transversely of said sheet to cut the same, and means adapted to travel in advance of said knife for providing a furrow in said abrasive coating whereby to remove the latter from the path of said knife.

4. In a cutting device for sheet material having a coating of abrasive material, a block having a knife fixed therein and adapted to be moved transversely of said sheet to cut the same, and a plow element carried by said block in advance of said knife.

JAMES H. NORRID.